United States Patent
Iwama

(10) Patent No.: US 12,358,457 B2
(45) Date of Patent: Jul. 15, 2025

(54) CEILING MOUNTED AIRBAG DEVICE AND PASSENGER RESTRAINT DEVICE

(71) Applicant: TOYOTA JIDOSHA KABUSHIKI KAISHA, Aichi-ken (JP)

(72) Inventor: Toshiki Iwama, Toyota (JP)

(73) Assignee: TOYOTA JIDOSHA KABUSHIKI KAISHA, Aichi-Ken (JP)

( * ) Notice: Subject to any disclaimer, the term of this patent is extended or adjusted under 35 U.S.C. 154(b) by 0 days.

(21) Appl. No.: 18/743,107

(22) Filed: Jun. 14, 2024

(65) Prior Publication Data

US 2025/0026298 A1 Jan. 23, 2025

(30) Foreign Application Priority Data

Jul. 18, 2023 (JP) ................... 2023-117120

(51) Int. Cl.
*B60R 21/214* (2011.01)
*B60R 21/233* (2006.01)
*B60R 21/2338* (2011.01)

(52) U.S. Cl.
CPC .......... *B60R 21/214* (2013.01); *B60R 21/233* (2013.01); *B60R 21/2338* (2013.01); *B60R 2021/23384* (2013.01)

(58) Field of Classification Search
CPC ... B60R 21/214; B60R 21/232; B60R 21/233; B60R 21/2338; B60R 2021/23153; B60R 2021/23161; B60R 2021/23308; B60R 2021/23324; B60R 2021/23382; B60R 2021/23384; B60R 2021/23386
See application file for complete search history.

(56) References Cited

U.S. PATENT DOCUMENTS

| | | | | |
|---|---|---|---|---|
| 6,722,691 | B1* | 4/2004 | Haland | B60R 21/233 280/743.2 |
| 6,932,380 | B2* | 8/2005 | Choi | B60R 21/232 280/730.1 |
| 7,195,276 | B2* | 3/2007 | Higuchi | B60R 21/231 280/743.1 |
| 10,589,708 | B2* | 3/2020 | Cho | B60R 21/0136 |
| 10,960,844 | B2* | 3/2021 | Jimenez | B60R 21/213 |

(Continued)

FOREIGN PATENT DOCUMENTS

| | | |
|---|---|---|
| JP | 2018-161965 A | 10/2018 |
| JP | 2021-054100 A | 4/2021 |
| WO | 2018/167919 A1 | 9/2018 |

*Primary Examiner* — Laura Freedman
(74) *Attorney, Agent, or Firm* — HAUPTMAN HAM, LLP

(57) ABSTRACT

A ceiling mounted airbag device has an airbag including a first chamber at a ceiling of a vehicle cabin and configured to rupture the ceiling during a vehicle head-on collision and to be expanded and deployed by a gas at a front side of a passenger seated in a vehicle seat, and the airbag including a second chamber configured to be expanded and deployed toward the passenger by a gas supplied from the first chamber; and a tension member coupling the first chamber with a support section at the ceiling, the tension member rupturing the ceiling and deploying accompanying expansion and deployment of the first chamber, and the tension member relatively pulling the first chamber upward and toward a rear side, in a vehicle front-rear direction, of the first chamber when the passenger, who begins to move toward a front side under inertia, is restrained by the second chamber.

8 Claims, 9 Drawing Sheets

(56) References Cited

U.S. PATENT DOCUMENTS

| | | | |
|---|---|---|---|
| 11,279,311 B2* | 3/2022 | Schroeder | B60R 21/233 |
| 11,345,300 B2* | 5/2022 | Fischer | B60R 21/239 |
| 11,498,508 B2* | 11/2022 | Jayasuriya | B60R 21/23138 |
| 11,577,682 B1* | 2/2023 | Bates | B60R 21/214 |
| 11,613,226 B2* | 3/2023 | Fischer | B60R 21/232 |
| | | | 280/730.1 |
| 11,858,450 B2* | 1/2024 | Jayakar | B60R 21/232 |
| 2018/0272985 A1 | 9/2018 | Nagasawa | |
| 2020/0130627 A1 | 4/2020 | Imura et al. | |

* cited by examiner

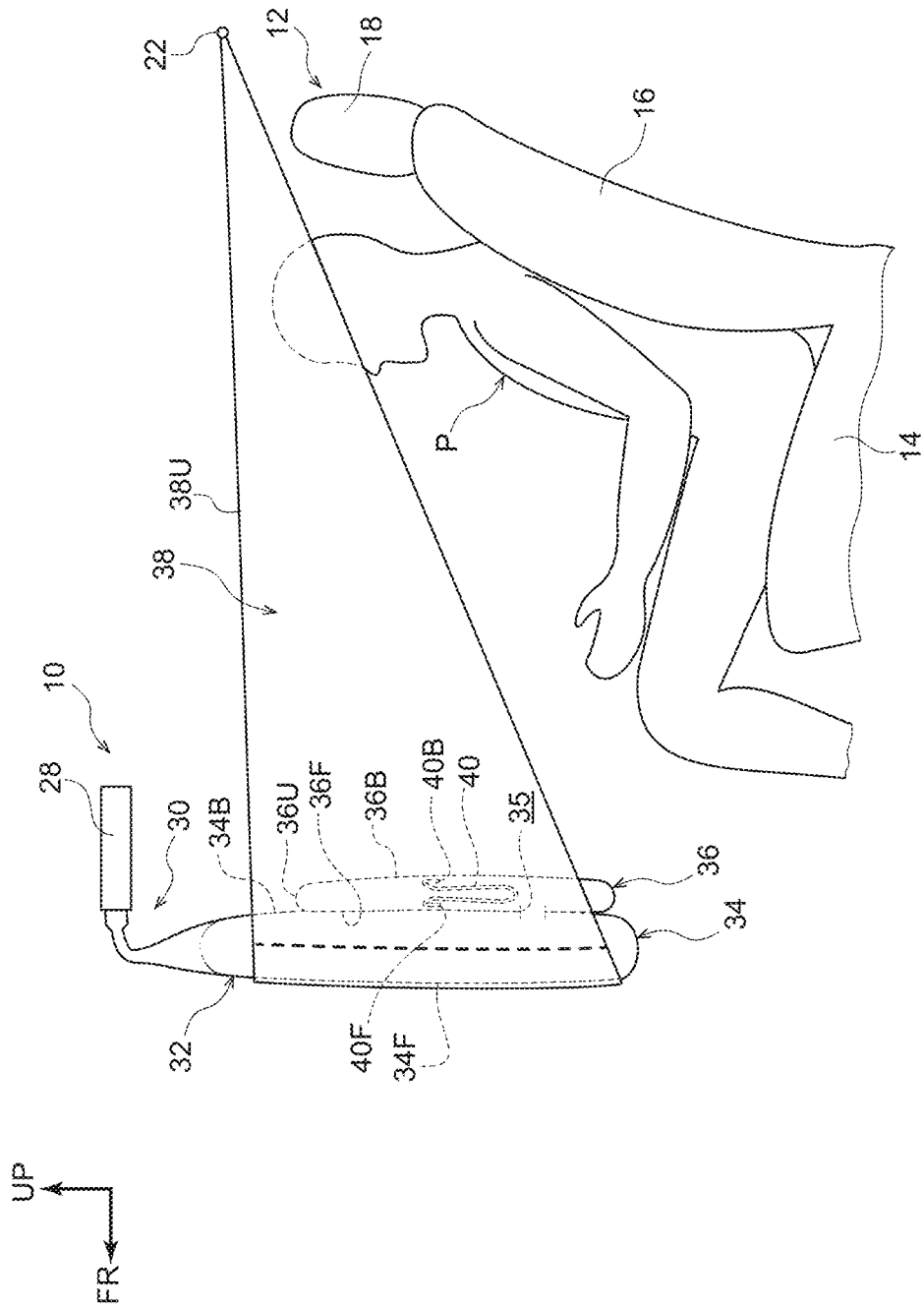

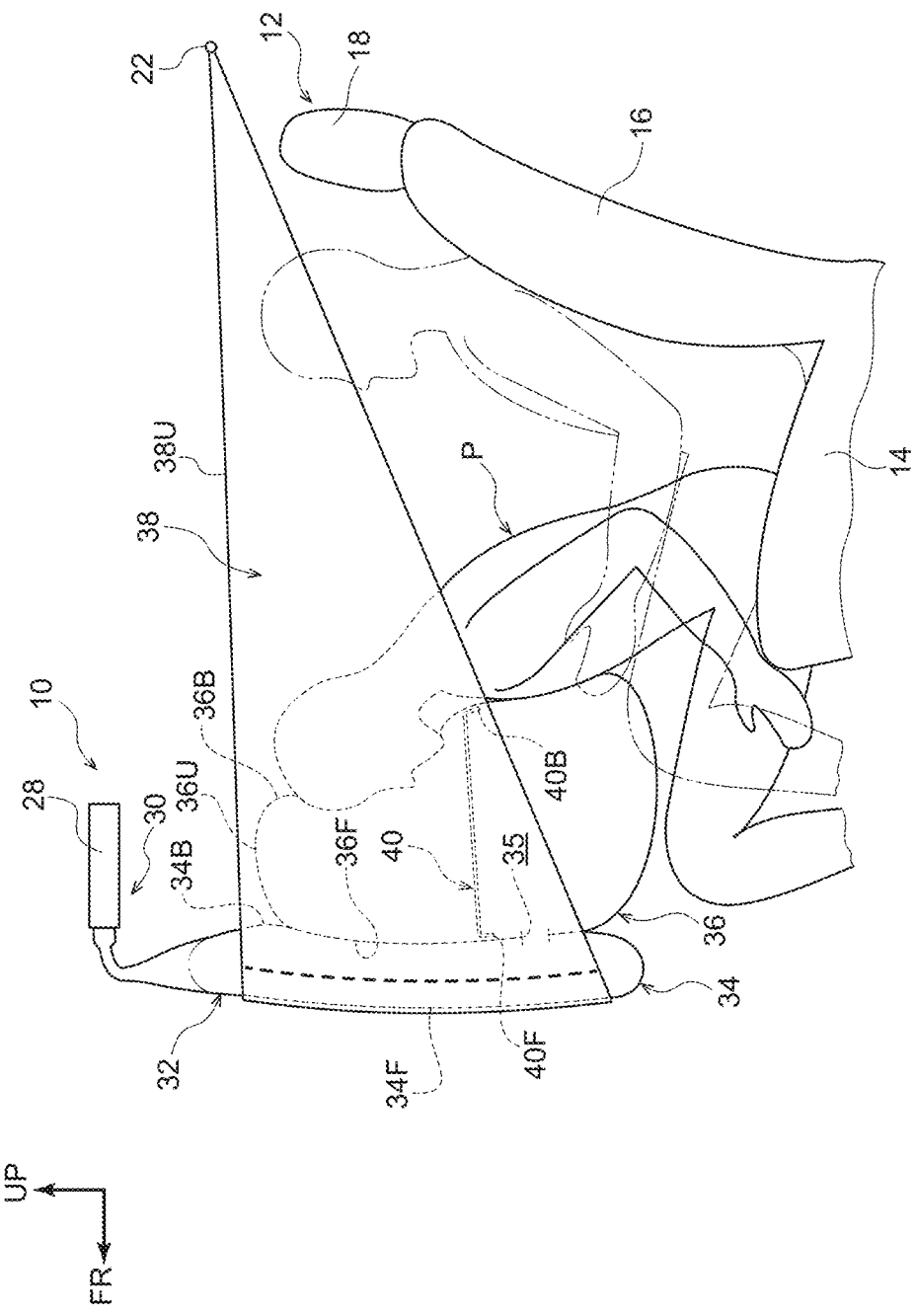

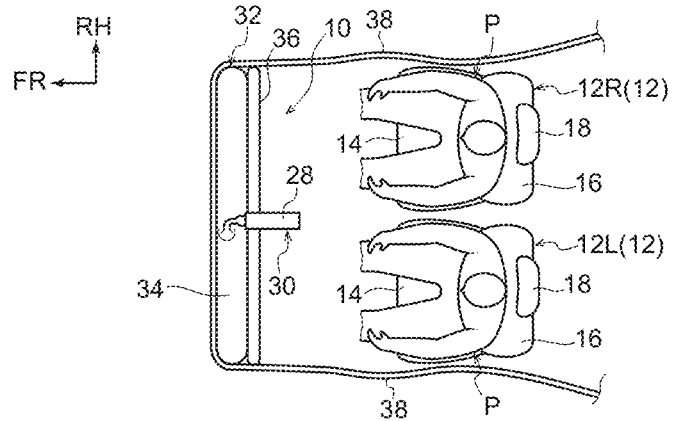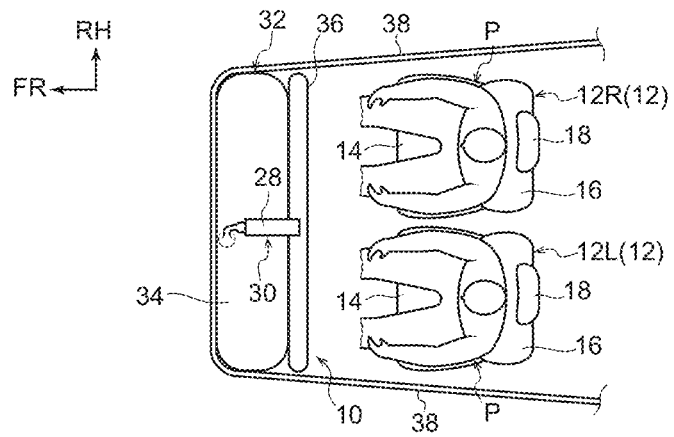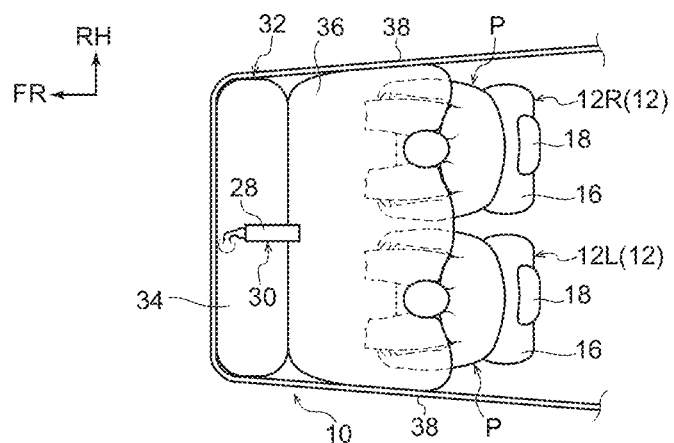

CEILING MOUNTED AIRBAG DEVICE AND PASSENGER RESTRAINT DEVICE

CROSS-REFERENCE TO RELATED APPLICATION

This application claims priority under 35 USC 119 from Japanese Patent Application No. 2023-117120 filed Jul. 18, 2023, the disclosure of which is incorporated by reference herein in its entirety.

BACKGROUND

Technical Field

The present disclosure relates to a ceiling mounted airbag device and passenger restraint device.

Related Art

A hitherto known passenger protection device includes an airbag that deploys downward from a ceiling of a vehicle during a vehicle head-on collision and that is formed from a single chamber disposed at a front side of a passenger, and includes a tether that couples a lower end portion of the airbag to the ceiling further to a rear side than a housing section for the airbag (see, for example, Japanese Patent Application Laid-Open (JP-A) No. 2018-161965).

Moreover, another hitherto known passenger protection device includes an airbag that is housed at a roof side of a vehicle, that deploys downward during a vehicle head-on collision, and that is formed from a single chamber for bearing the head of a passenger, and includes a coupling member that couples both side faces of a bottom end of the airbag to the roof further to a rear side than a housing section for the airbag (see, for example, JP-A No. 2021-054100).

SUMMARY

However, relative positional relationship, in a front-rear direction, between an airbag that deploys downward from a ceiling and that is disposed at a front side of a passenger and a passenger (upper body including the head thereof) changes according to a position, in the front-rear direction, of a vehicle seat.

This leads to a concern that, depending on the position of the vehicle seat, sufficient passenger restraint performance (effective restraint) might not be obtained by the airbag.

To address this issue, the present disclosure enables a passenger restraint device to be obtained that includes a ceiling mounted airbag device capable of effectively restraining a passenger irrespective of a position, in a front-rear direction, of a vehicle seat.

A ceiling mounted airbag device of a first aspect of the present disclosure includes an airbag and a tension member. The airbag includes a first chamber, which is installed at an upper side of a ceiling of a vehicle cabin and is configured to rupture the ceiling by being supplied with gas from an inflator during a vehicle head-on collision and to be expanded and deployed at a front side of a passenger seated in a vehicle seat, and the airbag including a second chamber that is configured to be expanded and deployed toward the passenger by being supplied with the gas from the first chamber. The tension member couples the first chamber with a support section provided at an upper side of the ceiling, the tension member ruptures the ceiling and deploys accompanying expansion and deployment of the first chamber, and the tension member relatively pulls the first chamber toward an upper side at a rear side, in a vehicle front-rear direction, of the first chamber in a case in which the passenger, who begins to move toward a front side under inertia, is restrained by the second chamber.

According to the first aspect, the first chamber of the airbag ruptures the ceiling of the vehicle cabin and expands and deploys at the front side of the passenger seated in the vehicle seat by being supplied with the gas from the inflator during a vehicle head-on collision. Furthermore, the second chamber of the airbag is expanded and deployed toward the passenger from the first chamber by being supplied with the gas from the first chamber. The tension member, which couples the first chamber with the support section provided at the upper side of the ceiling, ruptures the ceiling and deploys accompanying expansion and deployment of the first chamber, and the tension member relatively pulls the first chamber toward an upper side at a vehicle rear side of the first chamber in a case in which the passenger, who begins to move toward the front side under inertia, is restrained by the second chamber.

The load from the passenger, who begins to move toward the front side under inertia, is accordingly borne effectively by the second chamber that is pulled by the tension member relatively toward the upper side at the rear side of the first chamber through the first chamber. Namely, even though the second chamber is pressed toward the vehicle front side by the passenger during passenger restraint by the airbag, the passenger is still effectively restrained by compression deformation of the second chamber due to being able to obtain reaction force at the first chamber, which is pulled by the tension member. This means that changes in a distance between the passenger and the airbag due to a change of a position, in the front-rear direction, of the vehicle seat are more easily handled than in a ceiling mounted airbag formed with a single chamber, and an area where passenger restraint performance (passenger protection performance) is obtained to be enlarged. The present disclosure accordingly effectively restrains a passenger irrespective of the position, in the front-rear direction, of a vehicle seat. Note that reference to "during a head-on collision" encompasses cases in which a head-on collision is foreseen (predicted) to be unavoidable.

The ceiling mounted airbag device of a second aspect of the present disclosure is the ceiling mounted airbag device of the first aspect, wherein the tension member is configured by a sheet tether that covers at least an upper half of the expanded and deployed second chamber in a side view of a vehicle.

In the disclosure of the second aspect, the tension member is configured by the sheet tether that covers at least the upper half of the expanded and deployed second chamber in side view of a vehicle. This means that, compared to cases in which the tension member is configured by a left-right pair of strap tethers covering a bottom end portion of the expanded and deployed second chamber in side view of a vehicle, the occurrence of a malfunction, such as the neck of the passenger being snagged on a strap tether, is better able to be prevented.

A ceiling mounted airbag device according to a third aspect of the present disclosure is the ceiling mounted airbag device of the first aspect or the second aspect, wherein the second chamber is provided so as to reach a lower side than a center portion, in a vehicle up-down direction, of the expanded and deployed first chamber, and the second chamber is configured so as to be able to restrain at least a head and a chest of the passenger.

In the disclosure of the third aspect, the second chamber is provided so as to reach the lower side than the center portion, in the vehicle up-down direction, of the expanded the deployed first chamber, and the second chamber is configured so as to be able to restrain at least a head and a chest of the passenger. This means that an increase in capacity of the airbag (the first chamber and the second chamber) is better suppressed than with a ceiling mounted airbag formed from a single chamber covering at least from the ceiling as far as the chest of the passenger. Namely, an increase in the output of the inflator is suppressed, and a commensurate reduction in the manufacturing cost is achieved. Moreover, due to at least a head and a chest of the passenger being restrained by compression deformation of the second chamber, there is no concern regarding severe neck retroflexion of the passenger.

A ceiling mounted airbag device of a fourth aspect of the present disclosure is the ceiling mounted airbag device of any one of the first to third aspects, wherein a restriction tether is provided inside the second chamber to restrict a deployment length of the second chamber along a vehicle front-rear direction, and the restriction tether is configured such that the restriction of the second chamber is released when the vehicle seat is positioned at a specific position or further toward the vehicle rear side than the specific position.

In the disclosure of the fourth aspect, the restriction tether is provided inside the second chamber to restrict the deployment length (thickness) of the second chamber along the vehicle front-rear direction, and the restriction tether is configured such that the restriction is released when the vehicle seat is positioned at the specific position or further toward the vehicle rear side than the specific position. This means that the passenger is restrained by the second chamber having a thickness restricted by the restriction tether when the vehicle seat is positioned further toward the vehicle front side than the specific position. The restriction is released when the vehicle seat is positioned at the specific position or further toward the vehicle rear side of the specific position, and the passenger is restrained by the second chamber enlarged toward the vehicle rear side. Namely, even in cases in which the vehicle seat is positioned at the specific position or further toward the vehicle rear side of the specific position, the passenger is more effectively and appropriately restrained than with a ceiling mounted airbag formed from a single chamber.

The ceiling mounted airbag device of a fifth aspect of the present disclosure is the ceiling mounted airbag device of the fourth aspect, wherein the restriction tether is configured such that the restriction of the second chamber is released by severing.

In the disclosure of the fifth aspect, the restriction tether is configured such that the restriction is released by severing. This means that a sufficient structure of the restriction tether is simpler than for a configuration in which, for example, the restriction of the second chamber is released by a one-end portion of the restriction tether being detached.

A ceiling mounted airbag device of a sixth aspect of the present disclosure is the ceiling mounted airbag device of the fifth aspect, wherein the inflator is configured so as to be able to change output based on a result of detection of a position, in a vehicle front-rear direction, of the vehicle seat, and the restriction tether is configured so as to be severed by increased output of the inflator.

In the disclosure of the sixth aspect, the restriction tether is configured so as to be severed by increased output of the inflator having a variable output based on the detection result of the position of the vehicle seat. This means that a sufficient configuration is simpler than, for example, cases in which a mechanism to sever the restriction tether is separately provided.

A passenger restraint device of a seventh aspect of the present disclosure includes the ceiling mounted airbag device of any one of the first to sixth aspects, wherein the ceiling mounted airbag device is respectively provided for each vehicle seat.

In the disclosure of the seventh aspect, the ceiling mounted airbag device of any one of the first to sixth aspects is respectively provided for each vehicle seat, and so the passengers are effectively and appropriately restrained according to position, in the vehicle front-rear direction, of each of the vehicle seats.

A passenger restraint device of an eighth aspect of the present disclosure includes the ceiling mounted airbag device of any one of the first to sixth aspects, wherein the ceiling mounted airbag device is provided for an entirety of left-right adjacent vehicle seats.

In the disclosure of the eighth aspect, a reduction in the number of components is achieved due to the single ceiling mounted airbag device being provided for the entirety of left-right adjacent vehicle seats, and a reduction in manufacturing cost is achieved thereby.

A passenger restraint device of a ninth aspect of the present disclosure is the passenger restraint device of the eighth aspect, wherein the first chamber is a single first chamber provided for the entirety of the left-right adjacent vehicle seats, and the second chamber is provided one each for the left-right adjacent vehicle seats.

In the disclosure of the ninth aspect, the single first chamber is provided for the entirety of the left-right adjacent vehicle seats, and the second chambers are respectively provided to the left-right adjacent vehicle seats. A reduction in the number of components (reduction in manufacturing cost) is accordingly achieved, as well as the passengers being effectively and appropriately restrained according to the position, in the front-rear direction of each of the vehicle seats.

Thus as described above, the present disclosure enables a passenger to be effectively restrained irrespective of a position, in a front-rear direction, of a vehicle seat.

BRIEF DESCRIPTION OF THE DRAWINGS

Exemplary embodiments of the present disclosure will be described in detail based on the following figures, wherein:

FIG. 5 is a schematic side view illustrating an expansion and deployment initial-stage state of an airbag of a ceiling mounted airbag device according to a second exemplary embodiment;

FIG. 6 is a schematic side view illustrating an expansion and deployment later-stage state of an airbag of a ceiling mounted airbag device according to the second exemplary embodiment when a vehicle seat is positioned further toward a front side than a specific position;

FIG. 8A is a schematic plan view illustrating an expansion and deployment process of an airbag of a ceiling mounted airbag device according to a third exemplary embodiment provided for left-right adjacent vehicle seats;

FIG. 8B is a schematic plan view illustrating an expansion and deployment process of an airbag of a ceiling mounted airbag device according to the third exemplary embodiment provided for left-right adjacent vehicle seats;

FIG. 8C is a schematic plan view illustrating an expansion and deployment process of an airbag of a ceiling mounted airbag device according to the third exemplary embodiment provided for left-right adjacent vehicle seats;

DETAILED DESCRIPTION

Figure 1:
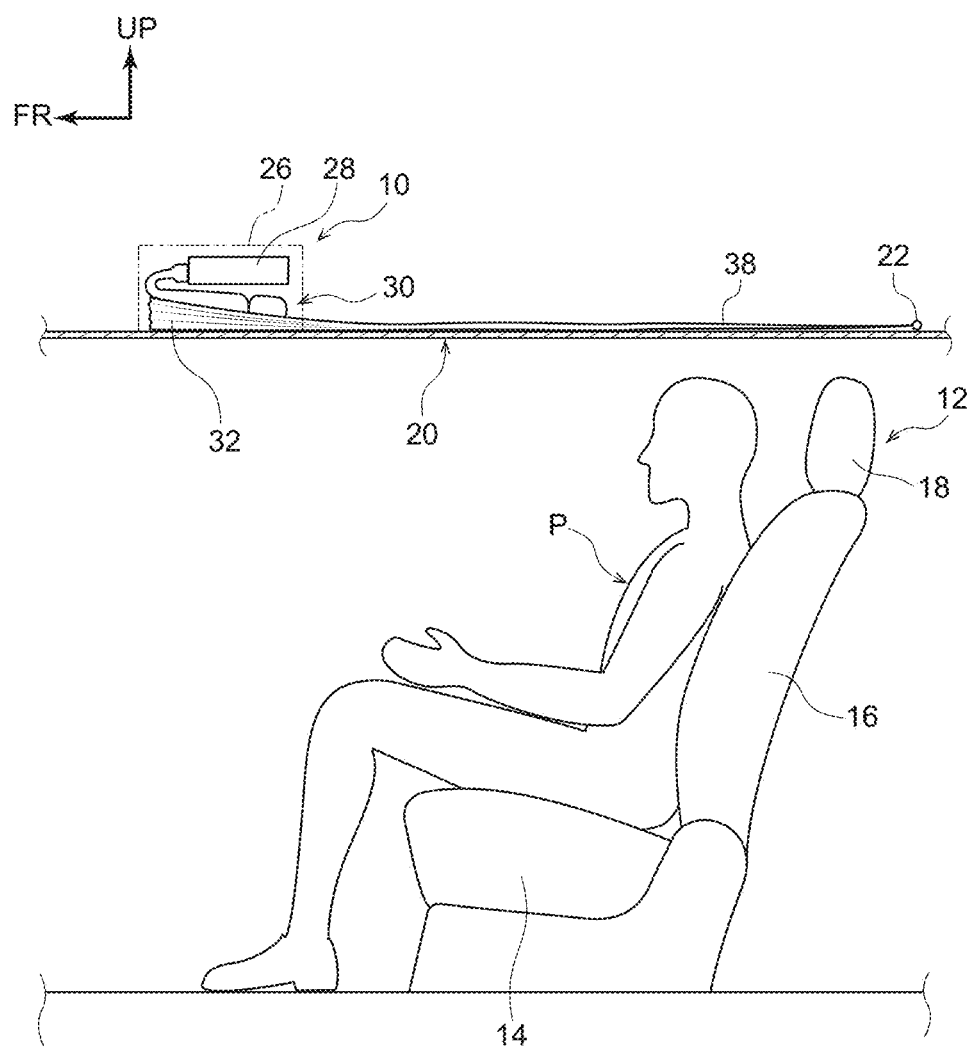
FIG. 1 is a schematic side view illustrating a state in which a ceiling mounted airbag device according to a first exemplary embodiment is installed at an upper side of a ceiling of a vehicle cabin.
Figure 2:
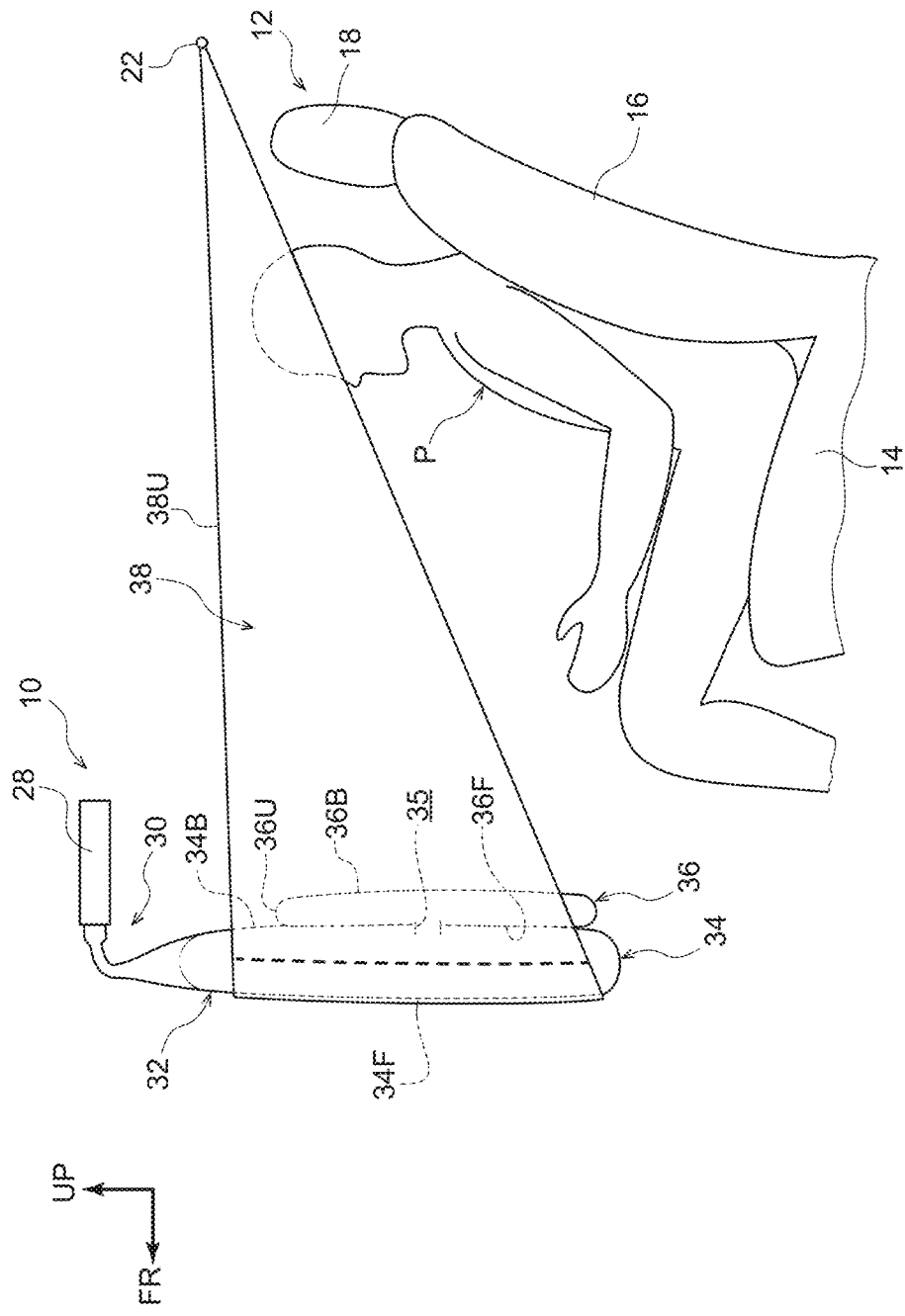
FIG. 2 is a schematic side view illustrating an expansion and deployment initial-stage state of an airbag of a ceiling mounted airbag device according to a first exemplary embodiment.
Figure 3:
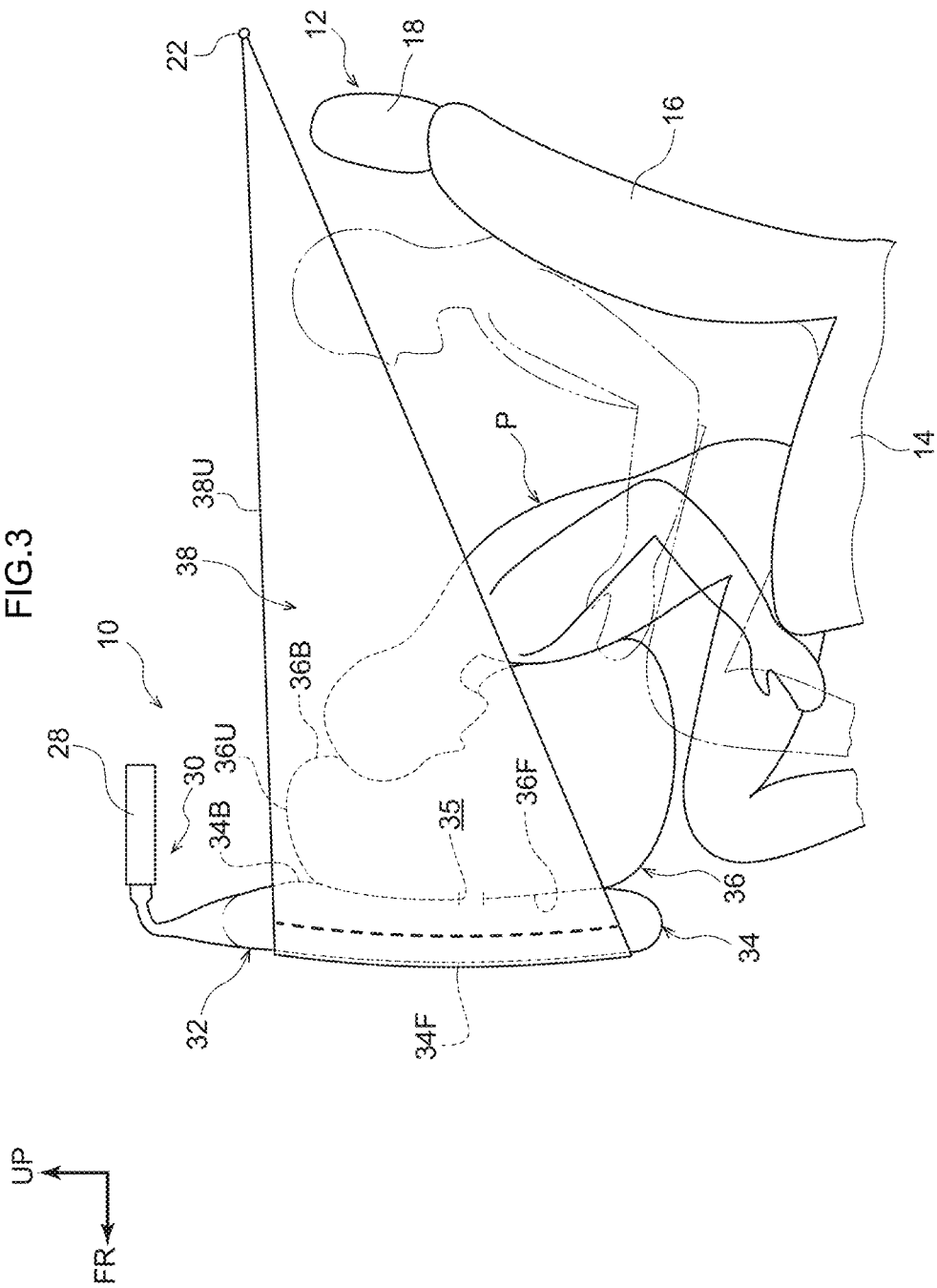
FIG. 3 is a schematic side view illustrating an expansion and deployment later-stage state of an airbag of a ceiling mounted airbag device according to the first exemplary embodiment.
Figure 4A:
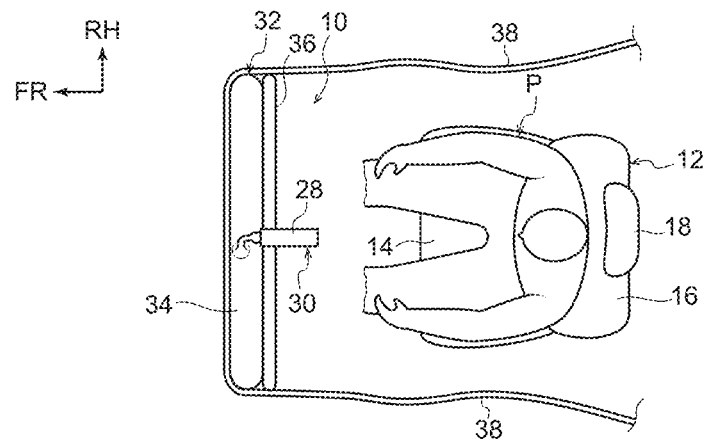
FIG. 4A is a schematic plan view illustrating an expansion and deployment process of an airbag of a ceiling mounted airbag device according to the first exemplary embodiment.
Figure 4B:
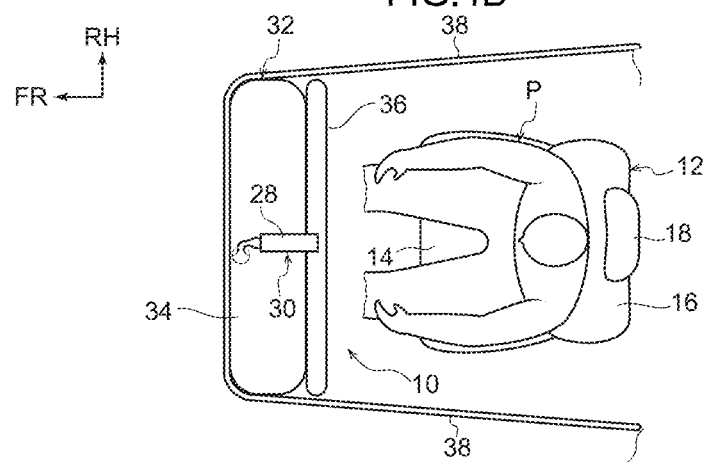
FIG. 4B is a schematic plan view illustrating an expansion and deployment process of an airbag of a ceiling mounted airbag device according to the first exemplary embodiment.
Figure 4C:
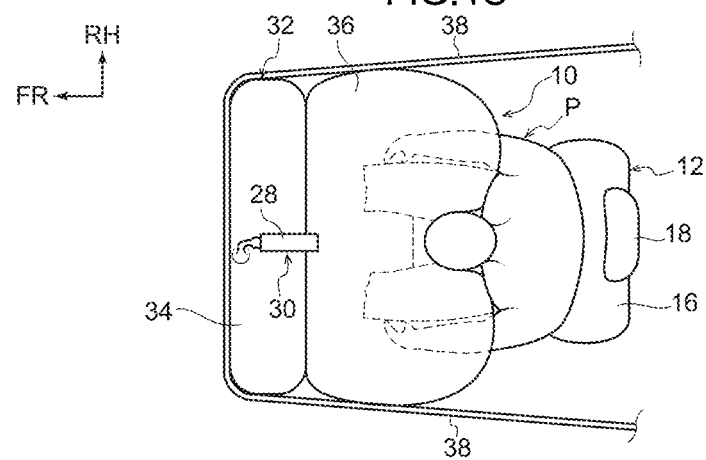
FIG. 4C is a schematic plan view illustrating an expansion and deployment process of an airbag of a ceiling mounted airbag device according to the first exemplary embodiment.

Detailed explanation follows regarding exemplary embodiments according to the present disclosure, with reference to the drawings. Note that for ease of explanation, where appropriate in the drawings arrow UP indicates an upward direction of a vehicle and vehicle seat, arrow FR indicates a forward direction of a vehicle and vehicle seat, and arrow RH indicates a right direction of a vehicle and vehicle seat. This means that in the following description, unless explicitly stated otherwise, reference to up and down, front and rear, and left and right directions indicate up and down, front and rear, and left and right directions of a vehicle and vehicle seat. Moreover, a left-right direction has the same definition as a vehicle width direction and seat width direction.

First Exemplary Embodiment

Description follows regarding a first exemplary embodiment. As illustrated in FIG. 1 to FIG. 4C, a passenger restraint device 10 is configured including a vehicle seat 12 and a ceiling mounted airbag device 30 (hereinafter sometimes simply referred to as "airbag device 30") provided for the vehicle seat 12.

The vehicle seat 12 is a vehicle front seat or rear seat of a vehicle where a wide space in the front-rear direction is able to be secured at a seat front side, such as in a self-driving car or the like. The vehicle seat 12 includes a seat cushion 14 for a passenger to sit on (supporting the buttocks and thighs of the passenger), a seatback 16 that is provided at a rear side of the seat cushion 14 so as to be capable of swinging about an axial direction along the seat width direction and supporting the back of the passenger, and a headrest 18 that is provided at an upper end portion of the seatback 16 and is capable of being raised and lowered to support the head of the passenger.

Note that in each of the drawings, a crash test dummy (dummy person) serving as a model of a passenger (seated person) to be protected is illustrated in a seated state on the seat cushion 14 of the vehicle seat 12. The dummy person is, for example, a head-on collision crash test dummy (Hybrid III) America Adult Male 50 percentile (AM50). The dummy person is seated in a standard seated posture as stipulated by the crash test method, and the vehicle seat 12 is positioned at the standard set position corresponding to the seated posture. The dummy person is referred to as "passenger P" below.

Moreover, the passenger P seated on the seat cushion 14 of the vehicle seat 12 is restrained in the vehicle seat 12 by a seatbelt provided in a seatbelt device (omitted in the drawings). Note that the seatbelt device is a three-point seatbelt device.

The airbag device 30 is installed at a front side of the vehicle seat 12 and at an upper side of a ceiling (roof head lining) 20 of a vehicle cabin. The airbag device 30 includes an airbag 32, an inflator 28, and a module case 26. The airbag 32 is normally in a folded state housed, together with the inflator 28, inside the module case 26. The module case 26 is formed in a hollow substantially cuboidal shape and is disposed at an upper side of the ceiling 20 of the vehicle cabin. Note that the module case 26 may be installed at a lower side of a non-illustrated roof panel (between the roof head lining and the roof panel).

The vehicle is provided with a control device (ECU) for controlling actuation of the inflator 28. The control device is electrically connected to the inflator 28 and to non-illustrated crash sensors (including a camera and the like), and is configured so as to be able to detect a vehicle head-on collision, or foresee (predict) that a head-on collision is unavoidable. The control device actuates the inflator 28 when a vehicle head-on collision is either detected or foreseen (hereafter referred to as "during a head-on collision") based on information from the crash sensors.

The inflator 28 is, for example, a combustion or cold gas type of cylinder inflator having a substantially cylindrical shape, and is disposed orientated with its axial direction along the front-rear direction. The inflator 28 generates gas under actuation by the control device during a vehicle head-on collision. Note that a vehicle head-on collision state when the control device actuates the inflator 28 encompasses offset head-on collisions, such as oblique collisions and small overlap collisions, in addition to full overlap head-on collisions.

The airbag 32 ruptures the ceiling 20 with expansion pressure arising from being supplied with gas from the inflator 28, and is thereby deployed and expanded toward a front side of the passenger P seated in the vehicle seat 12.

Note that a tear line (omitted in the drawings) is formed at the ceiling 20 as a break portion for rupturing, such that the airbag 32 breaks this tear line and expands and deploys. Moreover, a portion that breaks out from this tear line and rolls up configures an airbag door (omitted in the drawings).

The airbag 32 includes a first chamber 34, and a second chamber 36. In the airbag 32, gas from the inflator 28 is first supplied into the first chamber 34, the first chamber 34 ruptures the tear line formed at the ceiling 20, and the airbag 32 is accordingly expanded and deployed downward and disposed at a specific distance or greater away from and at the front side of the passenger P seated on the vehicle seat 12. Note that a configuration is adopted such that the first chamber 34 has a shorter length in the front-rear direction (has a thinner thickness) after expansion and deployment than the second chamber 36 after expansion and deployment.

The second chamber 36 is provided so as to reach a lower side of center portion, in a height direction, of a rear wall 34B of the expanded and deployed first chamber 34, and is supplied with gas from the first chamber 34 through a communication hole 35. Namely, the second chamber 36 is configured so as to be expanded and deployed toward the passenger P (rear side) delayed by a specific timing with respect to the first chamber 34. After being expanded and deployed, the second chamber 36 is disposed at a front side of at least the head and chest of the passenger P.

Note that the communication hole 35 is provided at a substantially center portion, in the height direction, and substantially at a center portion, in a left-right direction, of the second chamber 36. The second chamber 36 is formed with a height, width, and thickness after being expanded and deployed so as to be capable of restraining at least the head and chest of the passenger P (i.e. not just the head, but the chest of the passenger P too) beginning to move toward the front side under inertia during a vehicle head-on collision, and so as to be capable of compression deformation upon being pressed by at least the head and chest of the passenger P (see FIG. 3).

Moreover, the first chamber 34 and the second chamber 36 are each formed in a bag shape by two sheets of base cloth being superimposed on each other and sewed together around peripheral edge portions thereof. The base cloth is configured, for example, from a polyamide or polyester based fabric. A front wall 36F of the second chamber 36 is then attached to the rear wall 34B of the first chamber 34 by sewing together at the periphery of the communication hole 35 formed, for example, in a circular shape.

Moreover at an upper side of the ceiling 20, as the first chamber 34 expands and deploys, the first chamber 34 ruptures the tear line (omitted in the drawings) formed at the ceiling 20 and deploys downward, and a sheet tether 38 is provided as a tension member coupling the expanded and deployed first chamber 34 to a left-right pair of support sections 22 provided a specific distance or greater further rearward than the module case 26 at an upper side of the ceiling 20.

The sheet tether 38 is configured so as to pull the first chamber 34 diagonally rearward and upward, that is relatively toward an upper side at a rear side of the first chamber 34, when at least the head and chest of the passenger P, who begins to move toward the front side under inertia, is restrained by the second chamber 36. Namely, a configuration is adopted in which the second chamber 36 is able to obtain a reaction force from the front side due to the first chamber 34 being pulled by the sheet tether 38.

Note that the sheet tether 38 is formed with a size after deployment such that when at least the head and chest of the passenger P are restrained by the expanded and deployed second chamber 36, the sheet tether 38 is capable of covering both left and right sides of at least the head and neck of the passenger P in side view along the vehicle width direction. In other words, the sheet tether 38 is formed with a size that covers at least an upper half of the expanded and deployed second chamber 36 in side view, with an upper peripheral edge portion 38U of the sheet tether 38 being positioned further upward than an upper end face 36U of the expanded and deployed second chamber 36 (see FIG. 3).

Moreover, the sheet tether 38 is formed with a size substantially covering the entire front wall 34F of the first chamber 34, and an overlapping peripheral area is attached to the first chamber 34 (to the airbag 32) by being sewed to the first chamber 34 so as to cover the front wall 34F of the first chamber 34.

In order to facilitate efficient pulling of the first chamber 34 relatively diagonally rearward and upward, the sheet tether 38 is formed in side view with a substantially right angled triangle shape with, the right angle at a front end upper portion thereof. Namely, the sheet tether 38 is formed, for example, from a single piece of polyamide or polyester based fabric that has a substantially obtuse equilateral triangular shape when viewed face-on.

Explanation next follows regarding operation and advantageous effects of the ceiling mounted airbag device 30 and the passenger restraint device 10 according to the first exemplary embodiment configured as described above.

The inflator 28 is actuated under control of the control device during a vehicle head-on collision, and gas is ejected from the inflator 28. The gas ejected from the inflator 28 is supplied into the first chamber 34 of the airbag 32. When this occurs, the tear line formed at the ceiling 20 of the vehicle cabin receives the expansion pressure of the first chamber 34 and ruptures, and the first chamber 34 of the airbag 32 is expanded and deployed downward.

Namely, the first chamber 34 is expanded and deployed a specific distance or greater away from and at the front side of the passenger P seated on the vehicle seat 12. By gas being supplied from the first chamber 34 through the communication hole 35, the second chamber 36 is then expanded and deployed toward the passenger P (rearward) delayed by a specific timing from the first chamber 34.

Moreover, accompanying expansion and deployment of the first chamber 34, the sheet tether 38, which couples the expanded and deployed first chamber 34 to the left-right pair of support sections 22 that are provided at the upper side of the ceiling 20, ruptures tear lines formed at the ceiling 20 and deploys. The sheet tether 38 then pulls the first chamber 34 relatively diagonally rearward and upward, when at least the head and chest of the passenger P, beginning to move toward the front side under inertia, is restrained by the second chamber 36. Namely, the sheet tether 38 forms, together with the first chamber 34, a reaction force surface for the second chamber 36.

This means that the load from the passenger P who begins to move toward the front side under inertia can be effectively borne by the second chamber 36 that is being pulled relatively diagonally rearward and upward by the sheet tether 38 through the first chamber 34. Namely, even though the second chamber 36 is pressed forward by the passenger P during passenger restraint, a reaction force is obtained due to the first chamber 34 being pulled by the sheet tether 38, enabling the second chamber 36 to be deformed by compression and at least the head and chest of the passenger P to be restrained.

This accordingly makes it easier to handle a change in a distance between the passenger and the airbag arising from changes at position, in the front-rear direction, of the vehicle seat 12 than with a ceiling mounted airbag formed with a single chamber (omitted in the drawings), and accordingly enables an area where passenger restraint performance (passenger protection performance) is obtained to be enlarged. The first exemplary embodiment accordingly enables at least the head and chest of the passenger P beginning to move toward the front side under inertia due to the impact of a vehicle head-on collision to be effectively and appropriately restrained irrespective of the position, in the front-rear direction, of the vehicle seat 12.

Moreover, a tension member to pull the first chamber 34 diagonally rearward and upward is configured by the sheet tether 38 covering at least the upper half of the expanded and deployed second chamber 36 in side view. This means that compared to cases in which, for example, the tension member is configured by a left-right pair of strap tethers (omitted in the drawings) coupling a bottom end portion of the expanded and deployed second chamber 36 to the support sections 22, the occurrence of a malfunction, such as the neck of the passenger P being snagged and damaged by a strap tether, is better able to be prevented.

Moreover, the second chamber 36 is provided further to a lower side than a height direction center portion of the first chamber 34, and is configured so as to be able to restrain at least the head and chest of the passenger P. This accordingly enables an increase in the capacity of the airbag 32 (the first chamber 34 and the second chamber 36) to be suppressed compared to a ceiling mounted airbag formed from a single chamber covering at least from the ceiling as far as the chest of the passenger P (omitted in the drawings). Namely, an increase in the output of the inflator 28 can be suppressed, enabling a commensurate reduction in manufacturing cost.

Moreover, the second chamber 36 makes contact with the upper body (at least the head and chest) of the passenger P over a wide surface area, and not only the head but also the chest of the passenger P is restrained by compression deformation of the second chamber 36, thereby enabling a reduction in the load from the second chamber 36 imparted to the passenger P while also enabling the energy absorption performance by the second chamber 36 to be improved. This means that there is no concern that the passenger P might experience neck retroflexion, or even if some neck retroflexion were to occur, there is no concern regarding severe neck retroflexion.

Moreover, the second chamber 36 expands and deploys with a delay with respect to the first chamber 34, and so deployment malfunction of the airbag 32 can be suppressed or prevented from occurring better than in cases in which the second chamber 36 ruptures the tear line of the ceiling 20 and is expanded and deployed at the same time as the first chamber 34. Moreover, the airbag device 30 is provided for each of the vehicle seats 12, enabling the passengers P to be both effectively and appropriately restrained according to the front-rear position of each of the vehicle seats 12.

Second Exemplary Embodiment

Next, description follows regarding a second exemplary embodiment. Note that the same reference numerals will be appended to similar parts to those of the first exemplary embodiment described above, and detailed explanation thereof will be omitted.

Figure 7:
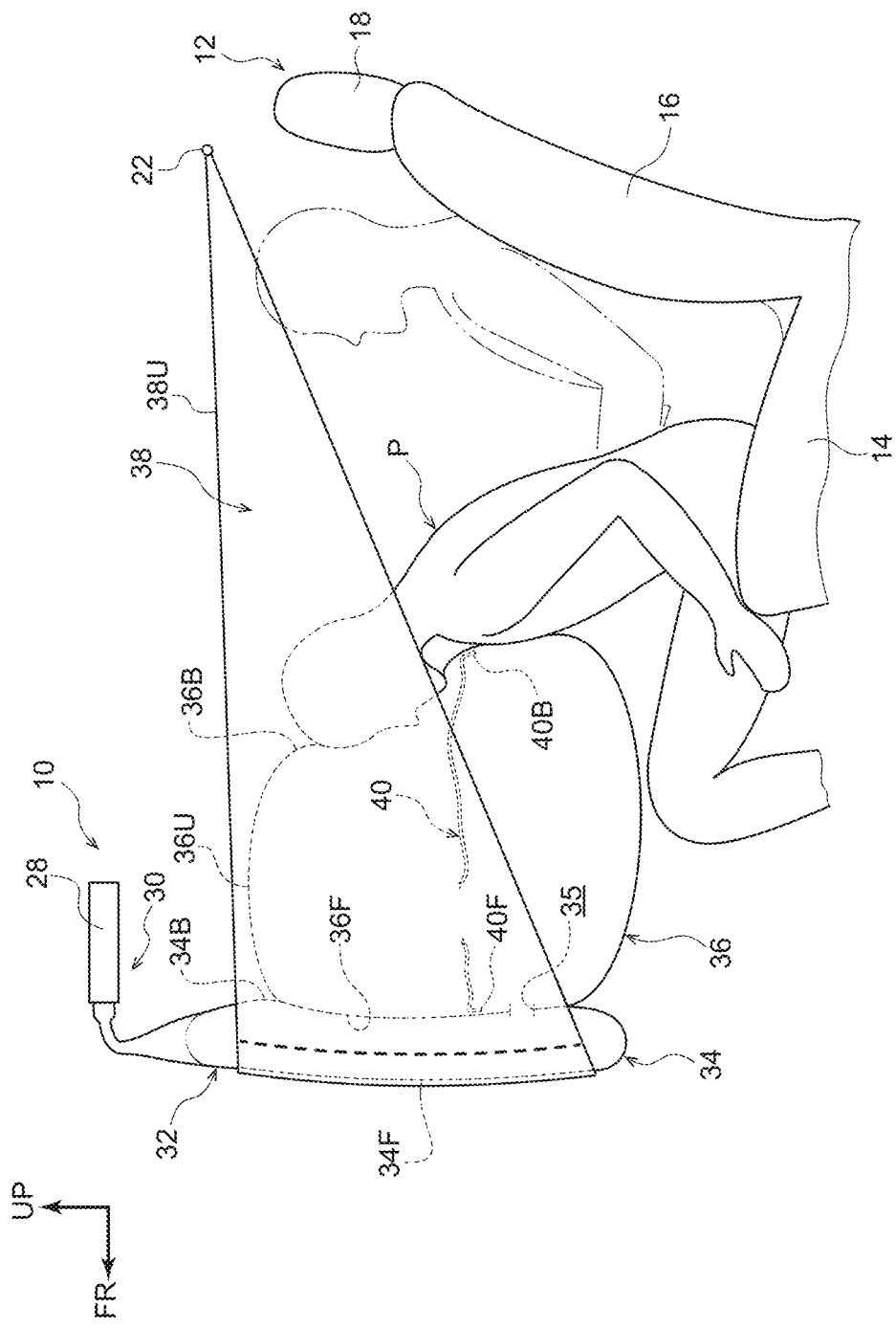
FIG. 7 is a schematic side view illustrating an expansion and deployment later-stage state of an airbag of a ceiling mounted airbag device according to the second exemplary embodiment when the vehicle seat is positioned at specific position or further toward a rear side thereof.

As illustrated in FIG. 5 to FIG. 7, the second exemplary embodiment differs from the first exemplary embodiment in that a single restriction tether 40 is provided inside the second chamber 36 to restrict a length (thickness) of the second chamber 36 along the front-rear direction. The restriction tether 40 is formed in a strap shape having a specific thickness and width (length along the left-right direction), with a front end portion 40F attached by sewing to a substantially center portion, in a height direction, and substantially center portion, in a left-right direction, of an inner face of the front wall 36F of the second chamber 36, and a rear end portion 40B thereof attached by sewing to a substantially center portion, in the height direction and substantially center portion, in the left-right direction, of an inner face of a rear wall 36B of the second chamber 36.

Note that although a communication hole 35 is illustrated as being provided further toward a lower side than the restriction tether 40 in side view, and gas supplied into the second chamber 36 from the communication hole 35 flows upward through a gap on both the left and right sides of the restriction tether 40, there is no limitation thereto. The communication hole 35 may be provided further toward an upper side than the restriction tether 40, with gas supplied into the second chamber 36 from the communication hole 35 flowing downward through a gap on both the left and right sides of the restriction tether 40.

Moreover, the restriction tether 40 is configured such that restriction thereof is released when the vehicle seats 12 is positioned at a specific position or further rearward therefrom. Specifically, the inflator 28 is configured so as to be able to change output based on a result of detection of a position, in the front-rear direction, of the vehicle seat 12, in a configuration in which restriction by the restriction tether 40 is released by the restriction tether 40 being severed by increased output of the inflator 28.

The position, in the front-rear direction, of the vehicle seat 12 is detected by a seat slide sensor (omitted in the drawings) provided at the vehicle, and the seat slide sensor is also electrically connected to the control device that controls actuation of the inflator 28. The inflator 28 is configured as a dual inflator such that output thereof can be controlled in two steps.

Although omitted in the drawings, the restriction tether 40 is formed such that a width at a specific site is narrower than at other sites, with perforations or the like cut along the width direction at this specific site in a configuration such that the restriction tether 40 is severed at this specific site when a specific tension is exceeded. A configuration is accordingly adopted in which there is automatic severance at the specific site when the tension of the restriction tether 40 resulting from the expansion action of the second chamber 36 has exceeded a specific value.

Operation and advantageous effects will be described for the ceiling mounted airbag device 30 and the passenger restraint device 10 according to the second exemplary embodiment configured as described above. Note that description of common operation and advantageous effects to those of the first exemplary embodiment described above will be omitted as appropriate.

As described above, a thickness (front-rear direction length) of the second chamber 36 is restricted by the restriction tether 40 provided inside the second chamber 36. This means that at least the head and chest of the passenger P can be restrained by the second chamber 36 having a thickness restricted by the single restriction tether 40 when the vehicle seat 12 is positioned further forward than the specific position. Namely, the passenger P who begins to move forward under inertia due to the impact of a vehicle head-on collision is able to be effectively and appropriately restrained.

However, when the vehicle seat 12 is positioned at the specific position or further toward the vehicle rear side thereof, the restriction tether 40 is severed by an increased output of the inflator 28, and such restriction is released. This means that when the vehicle seat 12 is positioned at the specific position or further toward the rear side thereof, at least the head and chest of the passenger P can be restrained by the second chamber 36 that has enlarged toward the rear side, as the restriction of the restriction tether 40 is released. Namely, even in cases in which the vehicle seat 12 is positioned at the specific position or further toward the rear side thereof, the passenger P who begins to move forward under inertia due to the impact of a vehicle head-on collision able to be restrained more effectively and appropriately than with a ceiling mounted airbag formed from a single chamber.

Moreover, the restriction tether 40 is configured such that the restriction thereof is released by severing of the restriction tether 40, enabling a simpler structure of the restriction tether 40 to suffice than in a configuration in which, for example, restriction thereof is released by using a mechanical structure to separate a one-end portion of the restriction tether 40 (a front end portion 40F or a rear end portion 40B) from the front wall 36F of the second chamber 36.

Moreover, the restriction tether 40 is configured so as to be severed by increased output of the inflator 28 having an output that varies based on a result of detection of the front-rear position of the vehicle seat 12, and so has a simpler configuration than, for example, when a separate mechanism is provided for severing the restriction tether 40.

Note that instead of the inflator 28 being a dual inflator, two of the inflators 28 may be provided to increase output. Namely, a configuration may be adopted in which a single inflator 28 is actuated alone when the vehicle seat 12 is positioned further forward than the specific position, and a second inflator 28 is actuated in succession to actuating the first inflator 28 when the vehicle seat 12 is positioned at the specific position or further rearward.

Third Exemplary Embodiment

Description follows regarding a third exemplary embodiment. Note that the same reference numerals are appended to similar sites to those of the first exemplary embodiment and the second exemplary embodiment described above, and detailed explanation thereof (including of common operation and advantageous effects) will be omitted.

As illustrated in FIG. 8, the third exemplary embodiment differs from the first exemplary embodiment and the second exemplary embodiment described above in that the airbag device 30 is provided for the entirety of left-right adjacent vehicle seats 12. Specifically, a single first chamber 34 and a single second chamber 36 of an airbag 32 are provided for the entirety of the left-right adjacent vehicle seats 12.

Adopting such a configuration with the airbag device 30 provided for the entirety of left-right adjacent vehicle seats 12 enables a reduction in number of components to be achieved compared to cases in which an airbag device 30 is provided for each of the vehicle seats 12, thereby enabling a reduction in manufacturing cost.

Figure 9A:
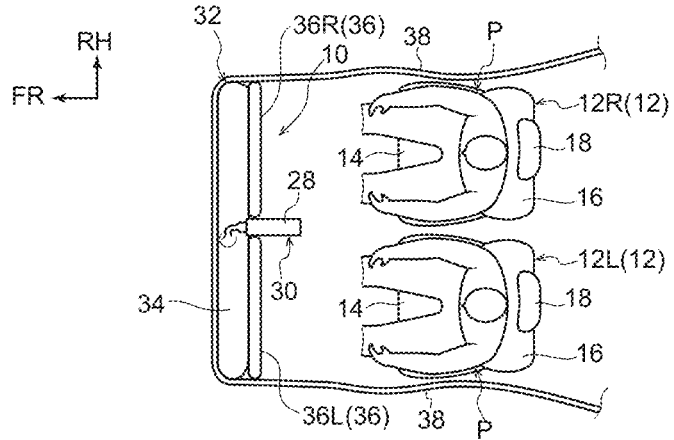
FIG. 9A is a schematic plan view illustrating an expansion and deployment process of an airbag of a ceiling mounted airbag device according to the third exemplary embodiment provided for left-right adjacent vehicle seats, for a case in which a second chamber is provided for each of the vehicle seats.
Figure 9B:
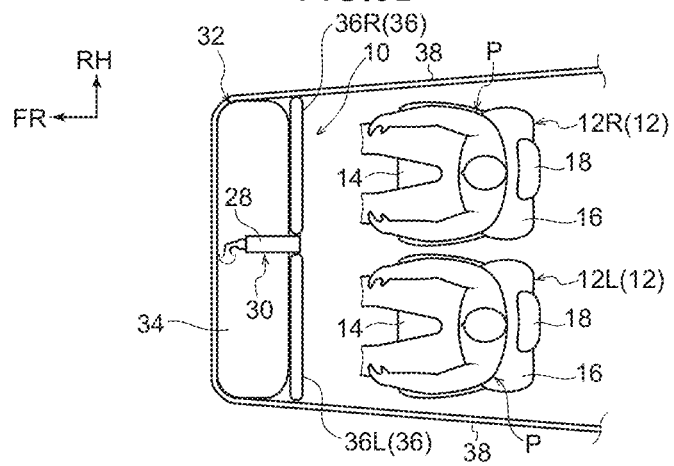
FIG. 9B is a schematic plan view illustrating an expansion and deployment process of an airbag of a ceiling mounted airbag device according to the third exemplary embodiment provided for left-right adjacent vehicle seats, for a case in which a second chamber is provided for each of the vehicle seats.
Figure 9C:
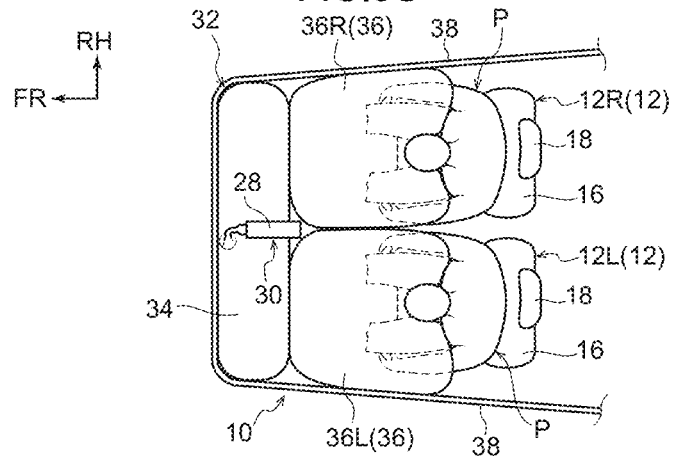
FIG. 9C is a schematic plan view illustrating an expansion and deployment process of an airbag of a ceiling mounted airbag device according to the third exemplary embodiment provided for left-right adjacent vehicle seats, for a case in which a second chamber is provided for each of the vehicle seats.

Note that as illustrated in FIG. 9, a single first chamber 34 may be provided for the entirety of the left-right adjacent vehicle seats 12, and a second chamber 36 may be provided for each of the left-right adjacent vehicle seats 12. Namely, the second chamber 36 may be configured including a right-side second chamber 36R for a vehicle seat 12R on the right side, and a left-side second chamber 36L for a vehicle seat 12L on the left side.

Adopting such a configuration enables a reduction in the number of components (reduction in manufacturing cost) to be achieved due to there being the first chamber 34 proved for the entirety of the left-right adjacent vehicle seats 12, while also enabling the passengers P to be effectively and appropriately restrained according to the front-rear position of each of the respective vehicle seats 12 due to there being one of the second chambers 36 provided for each of the left-right adjacent vehicle seats 12.

Although the ceiling mounted airbag device 30 and the passenger restraint device 10 according to the present exemplary embodiment have been described above with reference to the drawings, the ceiling mounted airbag device 30 and the passenger restraint device 10 according to the present exemplary embodiment are not limited to those illustrated, and appropriate design modifications may be made within a range not departing from the scope of the present disclosure.

For example, there is no limitation to the sheet tether 38 and any tension member configured so as not to snag the neck of the passenger P may be employed therefor. Moreover, in the second exemplary embodiment, the communication hole 35 may be provided at a substantially center portion, in the height direction, and at a substantially center portion, in the left-right direction, of the second chamber 36, and a left-right pair of restriction tethers 40 having a narrower width than that described above may be respectively provided at the left and right sides of the communication hole 35.

Moreover, configuration to release restriction of the restriction tether 40 is not limited to severing and for example, although this may result in a complicated structure, a configuration may be adopted in which the restriction is released by separating a one-end portion of the restriction tether 40 (a front end portion 40F or a rear end portion 40B). Moreover, the restriction tether 40 is not limited to a configuration that severs due to an increase in the output of the inflator 28, and a configuration that severs with another method may be adopted.

What is claimed is:

1. A ceiling mounted airbag device, comprising:
an airbag including a first chamber, which is installed at an upper side of a ceiling of a vehicle cabin and is configured to rupture the ceiling by being supplied with gas from an inflator during a vehicle head-on collision and to be expanded and deployed at a front side of a passenger seated in a vehicle seat, and the airbag including a second chamber that is configured to be expanded and deployed toward the passenger by being supplied with the gas from the first chamber; and
a tension member coupling the first chamber with a support section provided at the upper side of the ceiling, the tension member rupturing the ceiling and deploying accompanying expansion and deployment of the first chamber, and the tension member relatively pulling the first chamber toward an upper side at a rear side, in a vehicle front-rear direction, of the first chamber in a case in which the passenger, who begins to move toward a front side under inertia, is restrained by the second chamber, wherein
- a restriction tether is provided inside the second chamber to restrict a deployment length of the second chamber along the vehicle front-rear direction, and
- the restriction tether is configured such that a restriction of the second chamber is released when the vehicle seat is positioned at a specific position or further toward a vehicle rear side than the specific position.

2. The ceiling mounted airbag device of claim 1, wherein the tension member is configured by a sheet tether that covers at least an upper half of the expanded and deployed second chamber in a side view of a vehicle.

3. The ceiling mounted airbag device of claim 1, wherein the second chamber is provided so as to reach a lower side than a center portion, in a vehicle up-down direction, of the expanded and deployed first chamber, and the second chamber is configured so as to be able to restrain at least a head and a chest of the passenger.

4. The ceiling mounted airbag device of claim 1, wherein the restriction tether is configured such that the restriction of the second chamber is released by severing.

5. The ceiling mounted airbag device of claim 4, wherein:
- the inflator is configured so as to be able to change output based on a result of detection of a position, in the vehicle front-rear direction, of the vehicle seat; and
- the restriction tether is configured so as to be severed by increased output of the inflator.

6. A passenger restraint device, comprising: a ceiling mounted airbag device, wherein
the ceiling mounted airbag device includes:
- an airbag including a first chamber, which is installed at an upper side of a ceiling of a vehicle cabin and is configured to rupture the ceiling by being supplied with gas from an inflator during a vehicle head-on collision and to be expanded and deployed at a front side of a passenger seated in a vehicle seat, and the airbag including a second chamber that is configured to be expanded and deployed toward the passenger by being supplied with the gas from the first chamber; and
- a tension member coupling the first chamber with a support section provided at the upper side of the ceiling, the tension member rupturing the ceiling and deploying accompanying expansion and deployment of the first chamber, and the tension member relatively pulling the first chamber toward an upper side at a rear side, in a vehicle front-rear direction, of the first chamber in a case in which the passenger, who begins to move toward a front side under inertia, is restrained by the second chamber,
- a restriction tether is provided inside the second chamber to restrict a deployment length of the second chamber along the vehicle front-rear direction,
- the restriction tether is configured such that a restriction of the second chamber is released when the vehicle seat is positioned at a specific position or further toward a vehicle rear side than the specific position, and
- the ceiling mounted airbag device is respectively provided for each vehicle seat.

7. A passenger restraint device, comprising: a ceiling mounted airbag device, wherein
the ceiling mounted airbag device includes:
- an airbag including a first chamber, which is installed at an upper side of a ceiling of a vehicle cabin and is configured to rupture the ceiling by being supplied with gas from an inflator during a vehicle head-on collision and to be expanded and deployed at a front side of a passenger seated in a vehicle seat, and the airbag including a second chamber that is configured to be expanded and deployed toward the passenger by being supplied with the gas from the first chamber; and
- a tension member coupling the first chamber with a support section provided at the upper side of the ceiling, the tension member rupturing the ceiling and deploying accompanying expansion and deployment of the first chamber, and the tension member relatively pulling the first chamber toward an upper side at a rear side, in a vehicle front-rear direction, of the first chamber in a case in which the passenger, who begins to move toward a front side under inertia, is restrained by the second chamber,
- a restriction tether is provided inside the second chamber to restrict a deployment length of the second chamber along the vehicle front-rear direction,
- the restriction tether is configured such that a restriction of the second chamber is released when the vehicle seat is positioned at a specific position or further toward a vehicle rear side than the specific position, and
- the ceiling mounted airbag device is provided for an entirety of left-right adjacent vehicle seats.

8. The passenger restraint device of claim 7, wherein:
the first chamber is a single first chamber provided for the entirety of the left-right adjacent vehicle seats; and
the second chamber is provided one each for the left-right adjacent vehicle seats.

* * * * *